United States Patent
Canis et al.

(10) Patent No.: US 10,901,993 B2
(45) Date of Patent: Jan. 26, 2021

(54) PERFORMING CACHE UPDATE ADAPTATION

(71) Applicant: AMADEUS S.A.S., Sophia Antipolis (FR)

(72) Inventors: Laure Canis, Nice (FR); Jerome Bertrand, Pins (FR); Marek Herer, Nice (FR); Thomas Rondepierre, Antibes (FR); Divendar Umesh Murtadak, Waltham, MA (US); Nicolas Pasquier-Meunier, Boston, MA (US); Remi Moretti, Waltham, MA (US); Francis Sauch, Richmond (GB)

(73) Assignee: AMADEUS S.A.S., Biot (FR)

(*) Notice: Subject to any disclaimer, the term of this patent is extended or adjusted under 35 U.S.C. 154(b) by 260 days.

(21) Appl. No.: 15/944,657

(22) Filed: Apr. 3, 2018

(65) Prior Publication Data
US 2019/0303480 A1 Oct. 3, 2019

(51) Int. Cl.
*G06F 17/30* (2006.01)
*G06N 7/00* (2006.01)
(Continued)

(52) U.S. Cl.
CPC ...... *G06F 16/2455* (2019.01); *G06F 16/2379* (2019.01); *G06F 16/24552* (2019.01);
(Continued)

(58) Field of Classification Search
CPC ......... G06F 17/30477; G06F 17/30864; G06F 17/30377; G06F 16/2355; G06F 16/2379;
(Continued)

(56) References Cited

U.S. PATENT DOCUMENTS

2007/0288890 A1* 12/2007 Wells .................. G06F 8/38
717/113
2009/0234682 A1 9/2009 Baggett et al.
(Continued)

FOREIGN PATENT DOCUMENTS

EP 2908255 A1 8/2015
EP 3128441 A1 2/2017

OTHER PUBLICATIONS

Wikipedia—Confusion Matrix—Nov. 26, 2017—https://en.wikipedia.org/wiki/Confusion_matrix (Year: 2017).*
(Continued)

*Primary Examiner* — Syed H Hasan
*Assistant Examiner* — Chongsuh Park
(74) *Attorney, Agent, or Firm* — Perry + Currier

(57) ABSTRACT

A database system includes an original data source storing pieces of original data and a cache source storing pieces of cached data, each associated with an accuracy value. A method of processing queries in the system includes: for each randomly selected client query, retrieving a first piece of cached data matching the query, and retrieving a first piece of original data matching the query; for non-selected client queries, retrieving a second piece of cached data matching the query; evaluating the accuracy value of the second piece of cached data; if the accuracy value is below a given threshold, retrieving a second piece of original data matching the query, and updating the second piece of cached data by the second piece of original data; and adapting a probabilistic model based on the first piece of cached data and the first piece of original data using a machine learning algorithm.

15 Claims, 10 Drawing Sheets

(51) Int. Cl.
*G06N 99/00* (2019.01)
*G06F 16/2455* (2019.01)
*G06N 20/00* (2019.01)
*G06F 16/951* (2019.01)
*G06F 16/23* (2019.01)

(52) U.S. Cl.
CPC ........... *G06F 16/951* (2019.01); *G06N 7/005* (2013.01); *G06N 20/00* (2019.01)

(58) Field of Classification Search
CPC ............ G06F 16/24552; G06F 16/951; G06N 99/005; G06N 20/00; G06N 7/005
See application file for complete search history.

(56) References Cited

U.S. PATENT DOCUMENTS

| | | | |
|---|---|---|---|
| 2014/0052750 A1* | 2/2014 | Ciabrini | G06F 16/24552 707/769 |
| 2015/0032486 A1* | 1/2015 | Francois | G06Q 10/02 705/5 |
| 2015/0264155 A1* | 9/2015 | Hrle | H04L 67/2852 707/602 |
| 2016/0021188 A1* | 1/2016 | Tapia | H04L 67/1097 714/4.1 |
| 2016/0171008 A1 | 6/2016 | Ciabrini et al. | |
| 2016/0182678 A1* | 6/2016 | Wang | H04L 67/32 707/737 |

OTHER PUBLICATIONS

GeeksforGeeks,—Confusion Matrix in Machine Learning,—Dec. 2017,—GeeksforGeeks (http://www.geeksforgeeks.org/confusion-matrix-machine-learning) (Year: 2017).*

Redjem Bouhenguel—Adaptive Energy-Aware Real-Time Detection Models for Cardiac Atrial Fibrillation—Dec. 2012—http://fau.digital.flvc.org/islandora/object/fau%3A4017 (Year: 2012).*

EPO, Extended European Search Report, dated Jul. 10, 2019, re European Patent Application No. 19166538.9.

* cited by examiner

PERFORMING CACHE UPDATE ADAPTATION

TECHNICAL FIELD

The subject disclosure generally relates to computers and computer software, and in particular to methods, systems, and computer program product that handle search queries in a database system and perform cache update adaptation.

BACKGROUND

Recent developments in database technology show that it is a common issue to ensure short response times to search queries which require processing large volumes of data. For example, such processing has to be performed in response to so-called "open queries" which contain only little input information (e.g., only one or two parameters out of a dozen possible parameters are specified and/or the specified value ranges of the parameters are broad) and, consequently, lead to a large number of results in general. Possibilities to speed up data processing by increasing hardware performance are limited. Thus, attention is drawn to improving the mechanisms underlying the processing of large data volumes.

One general approach to shorten response times to queries is to pre-compute or pre-collect result to search queries and maintain them in a cache. Search queries are then actually not processed on the large volumes of data, but on the results as maintained in the cache.

Caching, however, has a drawback, namely that the results maintained in the cache may become outdated due to changes in the data from which the results have been pre-computed or pre-collected and thus differ from that data. It is thus an issue to keep the pre-computed or pre-collected results up-to-date in order to ensure that queries returned by the results from the cache correctly reflect the corresponding data among the volumes of data. Strategies for keeping the cache up-to-date, that is the results maintained in the cache, are thus needed.

Various relatively simple strategies for keeping the cache up-to-date, as they are known in the prior art, concern, for example, re-computing or re-collecting the entire results maintained in the cache frequently, establishing and maintaining re-computation or re-collection schedules manually and re-computing or re-collecting the results when they are considered outdated. In general, re-computing or re-collecting a large number of search results (or updating a cache) is a task consuming a substantial amount of computational resource as well as bandwidth resource. Thus, re-computation or re-collection techniques are sought to efficiently perform the re-computation or re-collection of the search results.

Another strategy to shorten the response times while ensuring validity of the search results with certain likelihood is discussed in EP 2 908 255 A1. According to this strategy, the validity of pre-computed or pre-collected search results is estimated and this validity estimation is utilized in order to return pre-computed or pre-collected search results to the client which are probably valid. More specifically, a method of handling queries in a database system having at least one client and at least one search platform is provided. The search platform maintains pre-computed search results which are associated which confidence factors. A confidence factor indicates a probability of the associated search result being valid. A query indicating at least one search criterion is received by the search platform. The search platform utilizes the confidence factors associated with the identified pre-collected search results to increase the mean probability of pre-collected search results being valid being returned to the client.

SUMMARY

According to a first aspect of the present disclosure, a method of processing queries in a database system is provided. The database system comprises an original data source storing a plurality of pieces of original data and a cache source storing a plurality of pieces of cached data, wherein each piece of cached data is associated with an accuracy value. The method comprises randomly selecting queries from among a plurality of queries handled by the database system, at the time the respective query is received from a client. Further, the method comprises, for each of the queries randomly selected, retrieving a first piece of the cached data matching the randomly selected query from the cache source, and retrieving a first piece of the original data matching the randomly selected query from the original data source. Also, the method comprises, for queries not being randomly selected, retrieving a second piece of the cached data matching the query from the cache source, evaluating the accuracy value of the second piece of the cached data, and if the accuracy value is below a given threshold, retrieving a second piece of the original data matching the query from the original data source, and updating the second piece of the cached data by the second piece of the original data. The method comprises adapting a probabilistic model based on the first piece of the cached data and the first piece of the original data using a machine learning algorithm. The accuracy value is derived from the probabilistic model and indicates a probability that a piece of the cached data coincides with a corresponding piece of the original data.

According to an example, the method comprises, for the queries randomly selected, comparing the first piece of the cached data and the first piece of the original data, updating the first piece of the cached data by the first piece of the original data, and returning the first piece of the original data to the client.

In another example, the method further comprises, for queries not being randomly selected, returning the second piece of the original data as a result to the client if the accuracy value is below the given threshold, and otherwise, returning the second piece of the cached data as the result to the client.

In yet another example, the method further comprises, for each of the queries randomly selected, sending information about the query, the first piece of the cached data and the first piece of the original data to a history database of the database system.

According to a further example, the method further comprises comparing the first piece of the original data with the first piece of the cached data, storing a first indicator value indicating whether the first piece of the original data coincides with the first piece of the cached data, comparing the accuracy value of the first piece of the cached data and the given threshold, storing a second indicator value indicating whether the accuracy value is below the given threshold, and updating the given threshold based on pairs of the first and the second indicator values.

In the further example, updating the given threshold may optionally comprise determining a polling rate and a polling efficiency based on the pairs of the first and second indicator values, and updating the given threshold based on the polling rate and the polling efficiency.

Further optionally, in the further example, the polling rate may be determined based on equation: (TP+FP)/(TP+FP+TN+FN), and the polling efficiency may be determined based on equation: TP/(TP+FP). In the equations, TP is a number of said pairs wherein the first indicator value indicates that the piece of the original data does not coincide with the piece of the cached data, and the second indicator value indicates that the accuracy value is below the given threshold. TN is a number of said pairs wherein the first indicator value indicates that the piece of the original data coincides with the piece of the cached data, and the second indicator value indicates that the accuracy value is not below the given threshold. FP is a number of said pairs wherein the first indicator value indicates that the piece of the original data coincides with the piece of the cached data, and the second indicator value indicates that the accuracy value is below the given threshold. FN is a number of said pairs wherein the first indicator value indicates that the piece of the original data does not coincide with the piece of the cached data, and the second indicator value indicates that the accuracy value is not below the given threshold.

According to a second aspect of the subject disclosure, a database system of processing queries is provided. The database system comprises an original data source storing a plurality of pieces of original data and a cache source storing a plurality of pieces of cached data, each piece of cached data being associated with an accuracy value. The database system is further configured to randomly select queries from among a plurality of queries handled by the database system, at the time the respective query is received from a client. Also, the database system is configured to, for each of the queries randomly selected, retrieve a first piece of the cached data matching the randomly selected query from the cache source, and retrieve a first piece of the original data matching the randomly selected query from the original data source. The database system is configured to, for queries not being randomly selected, retrieve a second piece of the cached data matching the query from the cache source, evaluate the accuracy value of the second piece of the cached data, and if the accuracy value is below a given threshold, retrieve a second piece of the original data matching the query from the original data source, and update the second piece of the cached data by the second piece of the original data. The database system is further configured to adapt a probabilistic model based on the first piece of the cached data and the first piece of the original data using a machine learning algorithm. The accuracy value is derived from the probabilistic model and indicates a probability that a piece of the cached data coincides with a corresponding piece of the original data.

According to a third aspect of the subject disclosure, a computer program product is provided. The computer program product comprises instructions which, when executed by a computer, cause the computer to perform the method according to the aspects of the first embodiment.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The accompanying drawings illustrate various embodiments of the subject disclosure and, together with the general description given above, and the detailed description of the embodiments given below, serve to explain the embodiments of the subject disclosure. In the drawings, like reference numerals are used to indicate like parts in the various views.

DETAILED DESCRIPTION

Before turning to the detailed description of embodiments, some more general aspects on involved techniques will be explained first.

Figure 1:
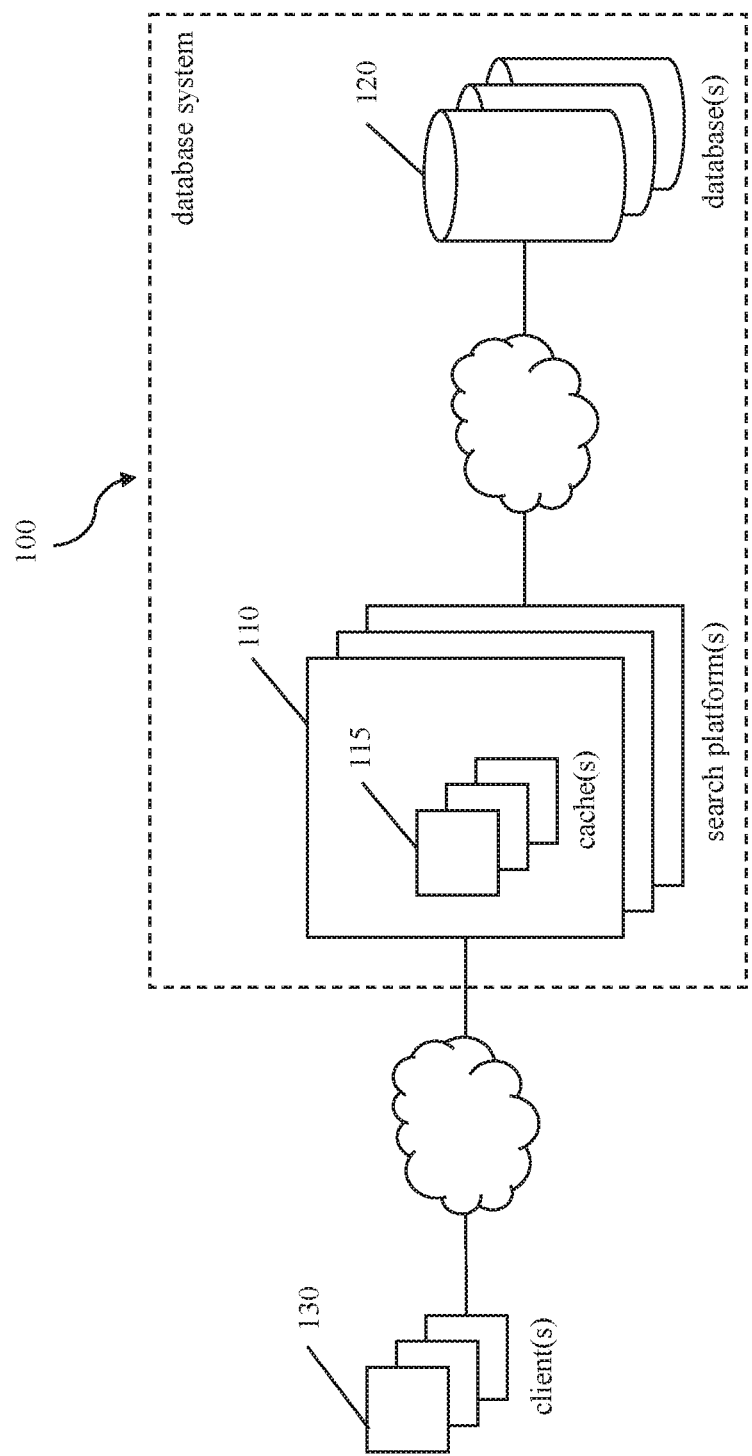
FIG. 1 shows an exemplary database system, in which a method of handling search queries may be performed.

The subject disclosure generally pertains to handling search queries in a database system. The term "search query" includes all types of database requests including e.g. read requests to retrieve data and write requests to insert, change or delete data. An exemplary database system 1 for handling search queries is shown in FIG. 1.

The database system 100 includes at least one search platform 110 and at least one database 120. To increase failure safety or performance, a plurality of search platforms 110 may be present. There may also be a plurality of databases 120 in order to increase capacity or performance. The plurality of databases 120 may be located at one site, or may be distributed over a plurality of sites. The at least one search platform 110 and the at least one database 120 are connected through a network such as a Local Area Network (LAN), a Metropolitan Area Network (MAN), or a Wide Area Network (WAN) such as the Internet.

The at least one database 120 stores original data. Herein, such databases 120 which store the original data are also referred to as original data source. In more detail, the at least one database 120 stores a plurality of pieces of original data. Here, the term "original data" means data that is valid and that forms the basis for all data processing within the database system 100, in particular the data to which search queries are directed. The term "database" here is meant to encompass any types of structured information storage system such as standard stand-alone databases like SQL or Non-SQL databases as well as complex, distributed and/or proprietary databases, relational databases or object-oriented databases. Finally, the term "piece" here means any type of structured information such as records, arrays, parts of database tables (e.g., columns, lines, or entries), or the like.

The pieces of original data may concern any type of information in a particular domain. For example, the original data may be located in the domain of computer-based electronic circuit simulations (such as circuit simulations subject of decision T 1227/05 by the EPO Boards of Appeal) and contain information on input values for the computer-based electronic circuit simulations, parameters of a model used by the computer-based electronic circuit simulations, intermediate and/or final simulation results, and the like. This computer-based electronic circuit simulation related data is kept in the at least one database 120 and may be queried by a computing system on which the computer-based electronic circuit simulation is carried out, e.g., via the at least one search platform 110, in order to retrieve input values or parameters, write or update the simulation results.

Further, in the database system 100, the at least one search platform 110 maintains pre-computed or pre-collected search results in order to decrease response times to answer search queries as compared to times required to retrieve the corresponding original data from the at least one database 120 and performing computation thereon to obtain the search results. In this regard, the terms "pre-computed" and "pre-collected" are used to cover any sort of pre-computation and pre-collection such as Internet crawlers collecting or copying the content of Internet web servers, but also complex and time-intensive computations of search results on the basis of underlying original data. In the domain of computer-based electronic circuit simulations, pre-computation may involve performing simulations with a reduced set of parameters (compared to with all parameters of the real-world system), but with varying values of said set of parameters in order to obtain results to be used as input values in the further simulations with additional or other sets of parameters.

In the at least one search platform 110, at least one cache source 115 for storing the search results may be provided. The data stored in the at least one cache source 115 is referred to as cached data and a plurality of pieces of cached data may be stored in the at least one cache source 115. For example, the pieces of cached data stored in the at least one cache source 115 may correspond to pieces of original data in the at least one database 120 (i.e., the original data source) and the plurality of the pieces of cached data in the at least one cache source 115 concerns a subset of the plurality of pieces of original data from the at least one database 120.

However, as already mentioned above, caching pre-computed or pre-collected search results maintained in the at least one cache source 115 of the at least one search platform 110 become outdated over time due to changes in the original data from which they have been pre-computed or pre-collected. Due to changes in the original data, differences between the corresponding cached data and original data occur and thus the cached data become invalid.

In order to provide an indication of the likelihood of whether the cached data is valid or not, the pre-collected or pre-computed search results maintained in the at least one cache source 115 by the search platform 110 are associated with accuracy values (also referred to as confidence factors herein). The accuracy values may be similar to the confidence factors as described by EP 2 908 255 A1. For example, each pre-collected or pre-computed search result stored by the search platform 110 has a corresponding accuracy value. Alternatively, one accuracy value may be associated with a plurality of pre-collected or pre-computed search results. An accuracy value indicates a probability of the associated pre-collected or pre-computed search result(s) being valid. That is, the accuracy value indicates a probability that a piece of the cached data stored in the at least one cache source 115 coincides with a corresponding piece of original data, i.e., a piece of original data from which the piece of cached data has been derived. The accuracy value associated with the pre-collected or pre-computed search results are utilized in order to decide whether to return the pre-collected or pre-computed search results from the at least one cache source 115 or from the at least one database 120.

The probabilistic model, from which the accuracy values of the pre-computed or pre-collected search results in the cache source 115 are generally derived, models the discrepancies between the cached (pre-computed or pre-collected) search results and search results (i.e., presumed or if they are actually retrieved) based on the original data in the at least one database 120. That is, the probabilistic model approximates the accuracy or inaccuracy of any cached search result. As an example, the probabilistic model models the probable validity of the cached search results over time.

Various types of probabilistic models may be employed. For example, the probabilistic model may be a conceptual model which has been generated by a structured modeling process known as scientific modeling. Modeling requires identifying and selecting those aspects and events of the real-world environment (here, e.g., the aspects and events having influence on the volatility and accuracy decreasing over time of the cached search results) and leaving aside other aspects which may be of no particular relevancy for the model's purpose. Furthermore, the identified and selected aspects may be abstracted and formulated/implemented in processable form such as a computer program and/or mathematical equations. Such a conceptual model may also serve as a means for computer-based simulation simulating the behavior (i.e., the volatility/accuracy) of the pre-computed or pre-collected search results over time. Alternatively, the employed probabilistic model may be a historic-statistical model which is based on monitoring and evaluating, e.g., the volatility/accuracy of the pre-computed or pre-collected search results in the given period of time in the past (e.g., three months) and extrapolates the determined trends into the future.

In addition to modeling the accuracy using the probabilistic model, a severe drop of accuracy is prevented by being reactive to events. Re-computation/re-collection decisions are refined on reception of pre-determined events which might have an impact on the correctness of the cached search results. The events may be asynchronous, i.e., the point of time of their occurrence is not predetermined—they can occur anytime, or synchronous, i.e., the point of time of their occurrence can be determined in advance—they may occur on a regular basis.

In FIG. 1, at least one client 130 (usually a plurality of clients) is connected to the at least one search platform 110 through a network such as a Local Area Network (LAN), Metropolitan Area Network (MAN), Wide Area Network (WAN) such as the Internet, or a mobile communication network such as Long Term Evolution (LTE). The connection may be wired or wireless. For example, the clients 130 may be personal computers or mobile communication devices such as smartphones, tablets, personal assistance, or the like.

In the following, it will be explained how the database system 100 shown in FIG. 1 handles search queries.

Figure 2:
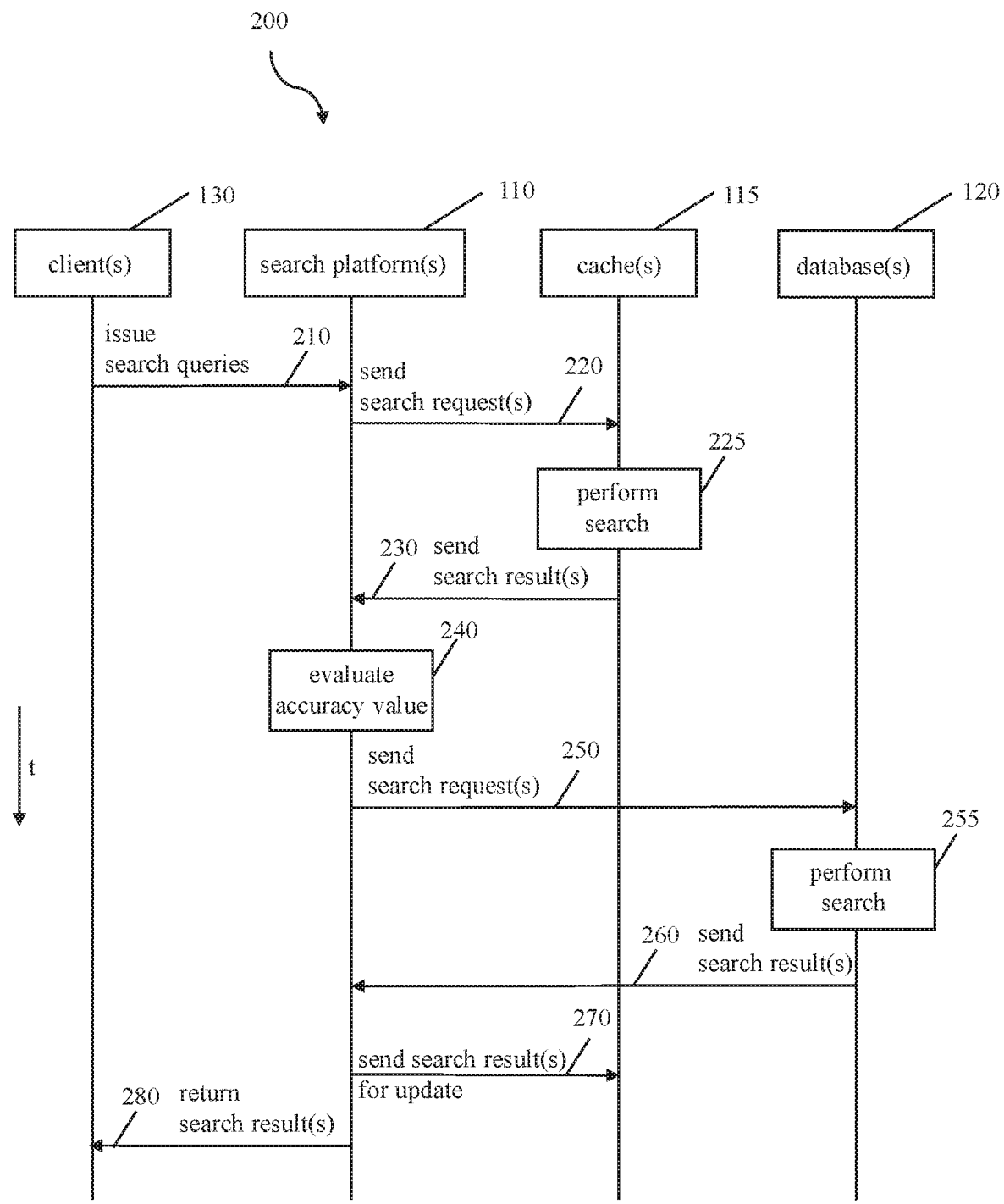
FIG. 2 shows an exemplary method of handling search queries in the exemplary database system of FIG. 1.

FIG. 2 illustrates a flow chart of a method 200 for handling search queries in the database system 100 of FIG. 1.

In operation 210, the plurality of clients 130 direct search queries to the search platform 110 including one or more search criteria or parameters. For example, if a search query is an Internet search, the search query might carry a search string, search text or search phrase as search criteria. A further search criterion may be the language of websites to be searched or an indication of a point of time of the first availability of the requested search string, search text or search phrase. In the above example, in the domain of computer-based simulations, the search query may carry, as search criteria, the name of an input parameter for which a value is needed by the computer-based simulation.

The search platform 110 receives the search queries, processes each of the search queries received from the clients 130 and performs corresponding searches within the pre-collected or pre-computed search results. In more detail, in operation 220, the search platform 110 may send a search request to perform a search for each search query to the cache source 115. The search request includes at least part of the one or more search criteria or parameters of the search query. The cache source 115 performs the search based on the search request, i.e., search for data among the cached data matching with the search criteria or parameters of the search request, in operation 225, and sends found cached data as pre-computed or pre-collected search results to the search platform 110 in operation 230. The pre-computed or pre-collected search results (i.e., cached data) have values or parameters which coincide (i.e., match) the search criteria or parameters of the search request.

Any matching pre-computed or pre-collected search result in the cache source 115 are returned by the search platform 110 to the client 130 from which the search query was received as response to the search query in operation 280. The client 130 receives this response and presents the search results to the user, or, in the domain of computer-based simulations, uses the same as inputs for the simulation carried out thereon.

In case matching pre-computed or pre-collected search results are not found in the cache source 115, the search platform 110 may make the search criteria or parameters of the search query less restrictive and performs a revised search by sending revised search requests with the less restrictive search criteria or parameters to the cache source 115. The search platform 110 may also perform the revised search by not applying all given search criteria or parameters. The particulars of which and how the search criteria or parameters of search queries are made less restrictive, and/or which search criteria or parameter are less important in search queries, may be set in the search platform 110 by given rules or determined using machine learning techniques, e.g., probabilistic models based on historical search criteria or parameters and pre-computed or pre-collected search results.

As described above, the search results in the cache source 115 may be associated with accuracy values. If so, in operation 240, the search platform 110 may evaluate the accuracy values of the pre-collected or pre-computed search results matching the search criteria or parameters before returning them to the clients 130, similar as in EP 2 908 255 A1. For example, the search platform 110 compares the accuracy values with a threshold (given in the search query by the clients 130, or prescribed in the search platform 110). Thereby, the search platform 110 determines the probability of the search results being valid, that is, the probability that the search results sent by the cache source 115 coincide with the corresponding original data in the database 120 from which they have been pre-collected or pre-computed.

If the accuracy values are above the given threshold, the search platform 110 returns the search results associated therewith in operation 280. Otherwise, for search results sent by the cache source 115 with accuracy values not above the given threshold, the search platform 110 retrieves corresponding original data from the databases 120. That is, the search platform 110 sends the respective search requests to the databases 120 in operation 250, and the databases 120 search for original data that match the search criteria or parameters in the search requests, in operation 255. Then, in operation 260, the databases 120 return the original data found. In response to receiving the original data from the databases 120, the search platform 110 returns the received original data as search results to the clients 130 in operation 280. The search platform 110 may also update the search results retrieved from the databases 120 in the cache source 115 by sending the same, in operation 270, to the cache source 115 for update. The cache source 115 updates the cached data by using the search results received from the search platform 110.

That is, similar to EP 2 908 255 A1, pre-computed search results associated with accuracy values indicating a probability of the associated search result being valid, are maintained in the cache. However, as in EP 2 908 255 A1, the accuracy values are of a static nature such that polling will be performed each time the accuracy values associated with particular search results indicate invalidity thereof. This leads to a great amount of unnecessary and thus inefficient polling because of the fact that the search results retrieved from the database by way of polling still coincide with the pre-computed search results. That is, the pre-computed search results are actually still valid even if the associated accuracy values indicate their invalidity. In addition, as already mentioned above, re-computation and re-collection of the search results is a task consuming a substantial amount of computation resources as well as bandwidth resources and the subject disclosure achieves efficiency improvements in updating cached data in a synchronous manner as original data is retrieved from the databases 120 preferably only for pieces of cached data that are likely outdated.

Herein, retrieving original data from the database 120 and using the same to update cached data in the cache 115 or to respond to search queries is also referred to as polling or polling operation. The polling may be performed in response to receiving a particular search query, i.e., in a synchronous manner, or independent of any search query. In the latter case, at least a part of, or the whole, cached data stored in the cache 115 is updated by way of a batch operation, in an asynchronous manner. The decision whether to poll or not is referred to as polling decision. For example, evaluating the accuracy value associated with the cached data against a given threshold, as in operation 240 of FIG. 2, in order to determine whether the cached data is likely valid or not and thus whether it is necessary to retrieve original data from the database, is a polling decision in the context of the subject disclosure.

The subject disclosure takes account of these issues and provides a method of adapting the probabilistic model in order to increase the efficiency of the polling decisions by decreasing the number of polling pieces of original data which have valid corresponding data in the cache 115 compared to EP 2 908 255 A1. In more detail, the subject disclosure allows to avoid unnecessary and inefficient polling or at least limit their amount by way of adapting the accuracy values and thus the decision to poll, thereby making them dynamic. This allows to limit the number of search requests or search queries to be performed against the databases 120 and thus solves the drawbacks of e.g. EP 2 908 255 A1. The general principles of the subject disclosure will now be described with reference to FIGS. 3 and 4.

Figure 3:
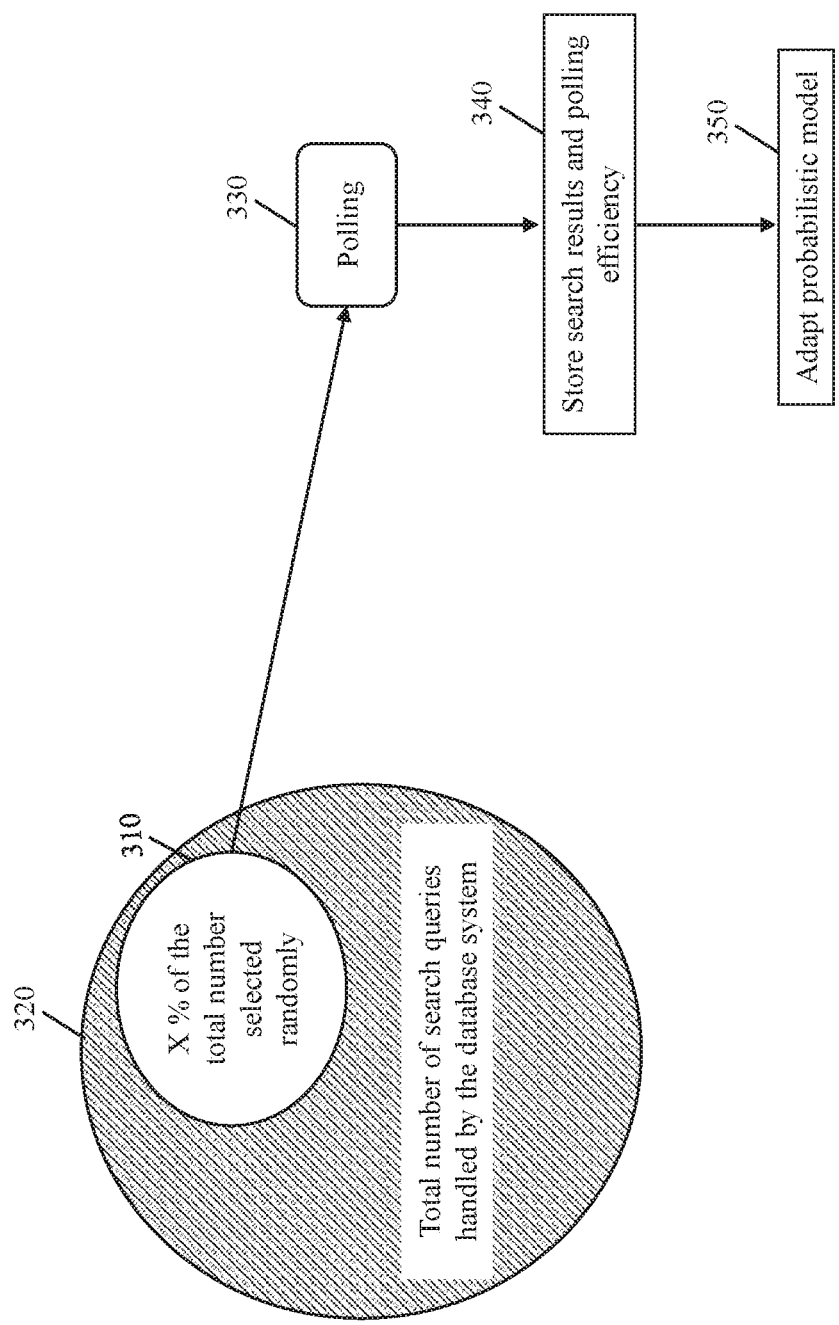
FIG. 3 shows principles of the subject disclosure to process queries and adapt the polling decision.

In general, the method of processing search queries as shown in FIG. 3 selects a number of search queries 310 from among all the search queries 320 handled by a database system such as the database system 100 shown in FIG. 1. In more detail, at the time a search query is received at the database system 100 from a client 130, it is decided whether to process the search query in the known manner as disclosed above with reference to FIG. 2, or to select the search query and handle the same as a selected search query 310. Selected search queries form actual queries which are processed in order to adapt the probabilistic model and are processed in a particular way, as described below. The decision to select a search query may be random, or based on certain prescribed factors such as, for example, search query-specific factors (e.g., the search query includes prescribed search criteria or parameter), client-specific factors (e.g., the search query is received from prescribed clients), or other factors (e.g., the search query is received at prescribed times or time intervals). The selected search query 310 is processed (operation 330) by retrieving the cached data from the cache source 115 and also retrieving the original data from the database 120, both matching the search criteria or parameters of the selected search query 310. The original data retrieved from the database 120 is returned to the client 130 and may also be used to update the cached data in the cache source 115. The retrieved cached data and the retrieved original data are used to adapt the probabilistic model. In particular, the retrieved cached data and the retrieved original data are compared to determine whether retrieving the original data would have been appropriate or not. That is, if the comparison results in that the retrieved cached data coincides with the retrieved original data, retrieving the original data would have been inexpedient as the cached data was still valid; otherwise, it would have been sensible as the cached data was invalid. This result indicating the efficiency of polling is stored together with the retrieved cached data and the retrieved original data (operation 340), and used to adapt the probabilistic model (operation 350) from which the accuracy value associated with the cached data is derived. The adaptation is preferably made by using a machine learning algorithm as will be described in more detail below. Accordingly, the probabilistic model is improved and the decision of whether polling (i.e., retrieving the original data from the database and updating the cached data) is necessary and thus efficient is adapted, thereby increasing the precision of the probability model. This allows to reduce the number of polling by improving the polling decision compared to EP 2 908 255 A1.

According to these principles, a number of search queries among all the search queries handled by the database system is selected for being handled differently than the search queries not selected. The selected search queries are handled as described above with reference to FIG. 3, while non-selected search queries are handled as described above with reference to FIG. 2. This results to determine whether polling would have been appropriate and thus efficient for cached data and corresponding original data as it can be determined whether the cached data have actually already become outdated or not. This is done in an online manner based on real search queries such that additional offline processing using, for example, test search queries or historical search queries can be avoided, while increasing the precision of the probability model.

Figure 4:
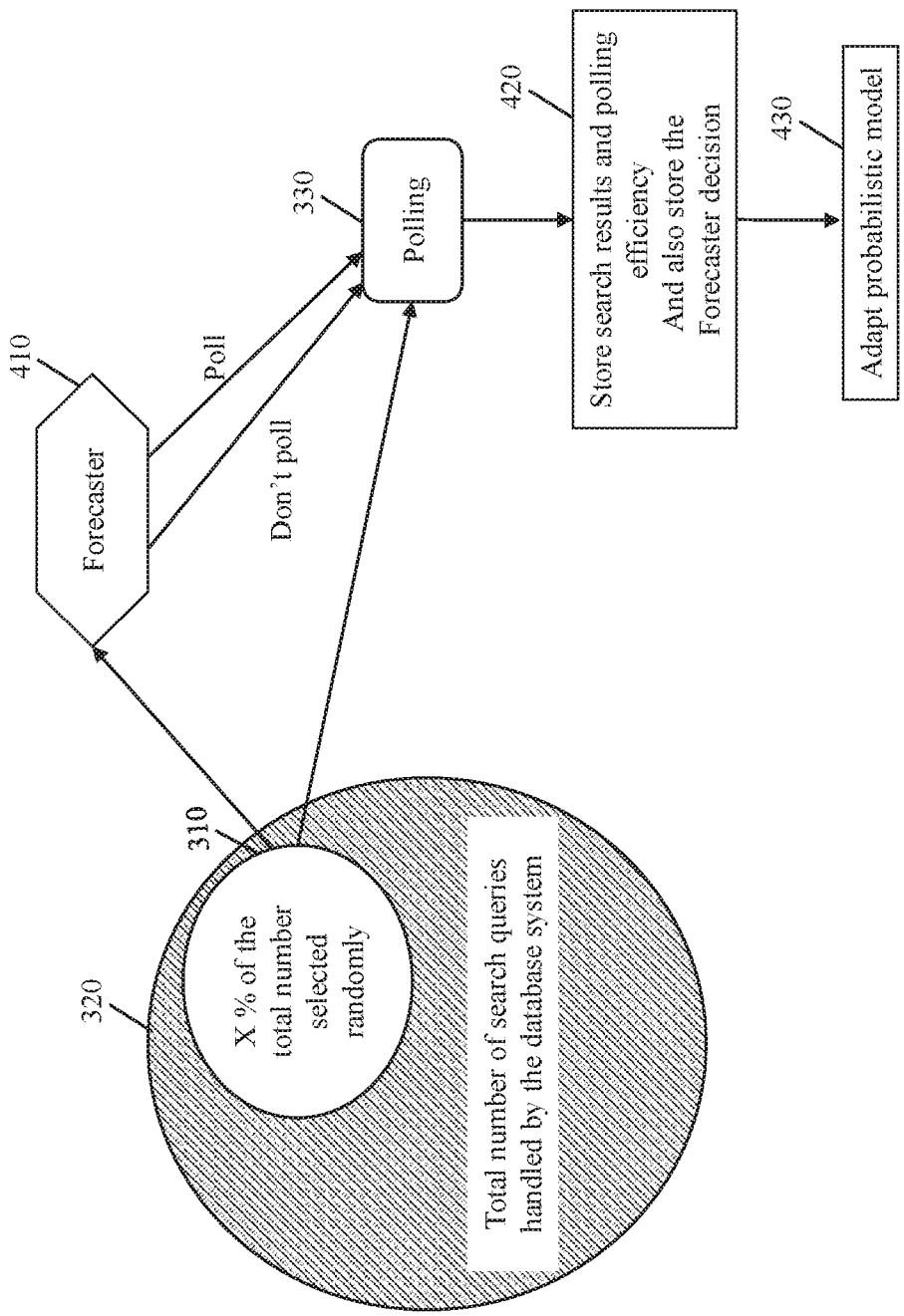
FIG. 4 shows further principles of the subject disclosure to process queries and adapt the polling decision.

The method shown in FIG. 3 may further be improved by taking into account the accuracy value associated with the cached data and the threshold value, as described above. As shown in FIG. 4, the method further comprises a process of forecasting 410 (which may be performed by a forecaster as will be described in connection with FIG. 6 below). In response to retrieving the cached data matching the search query, the accuracy value associated with the cached data are evaluated against the threshold value, similar to operation 240 of FIG. 2. The result of the process of forecasting 410 indicates either that polling would have been performed (i.e., the original data would have been retrieved and returned because the cached data are likely outdated) or not (i.e., the cached data are likely valid and would have been returned). This result indicating a process of forecasting (forecaster) decision is also stored (operation 420) and considered in adapting the probabilistic model using the machine learning algorithm (430). In this way, the result indicating the efficiency of polling and the result indicating a forecaster decision can be compared. For example, it can be determined whether the cached data have actually become outdated while evaluating the accuracy value against the threshold value shows that the cached data are likely not outdated. This further improves the probabilistic model and the decision of whether polling is necessary, thereby further increasing the precision of the probability model. This allows to limit the number of polling to a minimum.

Now, the method of processing search queries, as an aspect of the subject disclosure, will be described in more detail with reference to FIGS. 5 to 9.

The method is performed in the database system 600 comprising at least one database 120 as the original data source and at least one cache 115 as the cache source. The original data source 120 stores a plurality of pieces of original data, and the cache source 115 stores a plurality of pieces of cached data. Herein, it should be understood that the pieces of the cached data are retrieved from the original data source 120 and stored in the cache source 115 by a polling operation, and thus represent cached versions of pieces of original data. The cached data are however not limited to cached versions and may concern results of pre-computation or pre-collection processing based on the original data. The polling operation should be understood as to comprise the pre-computation or pre-collection processing. The cached data are associated with an accuracy value indicating a probability that the cached data coincides with the original data. For example, each piece of the cached data may be associated with such an accuracy value which indicates the probability that said piece of the cached data coincides with the corresponding piece of the original data, i.e., the piece of the original data from which it was derived. The accuracy value is derived from a probabilistic model established in the database system 600. The database system 600 further comprises a modeler 610 for maintaining and adapting the probabilistic model as well as deriving the accuracy values from the probabilistic model.

The database system 600 receives, in operation 510, a plurality of search queries (also briefly referred to as queries hereinafter) from the at least one client 130 connected to the database system 600 and handles the received search queries by a search platform similar to the search platform 110 of FIG. 1.

Figure 5:
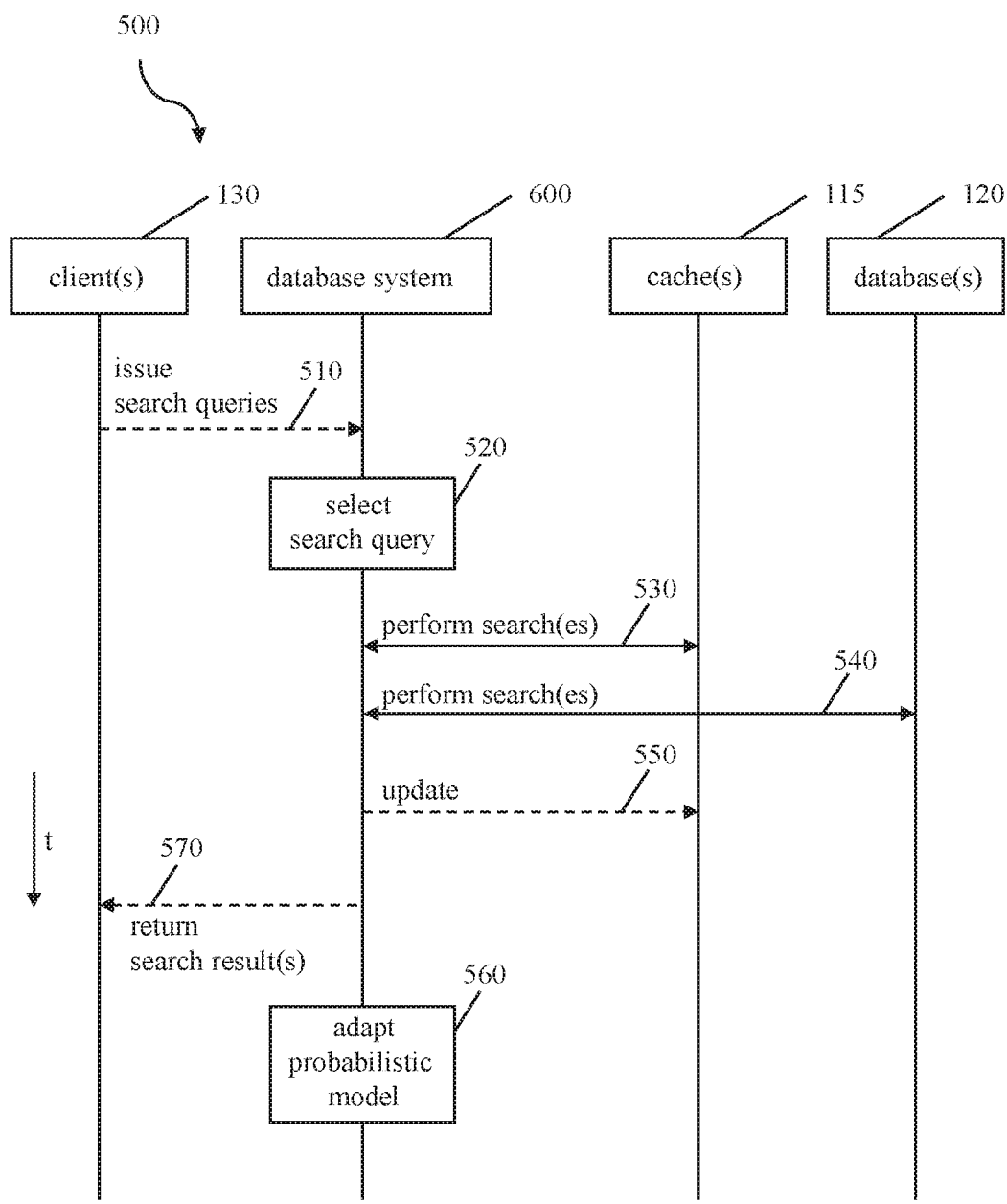
FIG. 5 shows a method of processing queries in accordance with the subject disclosure.

The method 500 of FIG. 5 starts with operation 520 for selecting search queries from among the plurality of search queries handled by the database system 600. In more detail, the database system 600 decides, at the time of receiving a particular search query from the at least one client 130 in operation 510, whether the search query is to be handled as a selected search query or not. This is done on a random basis, but may also be done on a regular basis or in accordance with given rules in other embodiments. For example, the regular basis may include to handle each tenth or hundredth search query as a selected search query. The given rules may define search criteria or parameters which if present in a search query designate the search query as to be selected, or other factors for designation as to be selected such as time of receipt, given number of search queries with similar or identical search criteria or parameters, given number of search queries received from the same client 130, or statistical models. The search query is handled as selected search query if designated by the given rules. In the database system 600, a selector 620 which receives the search query, an indication that the search query has been received, a copy of the search query, or the like, performs the operation 520 and designates the search query as selected search query.

In response to the search query having been selected in operation 520 (i.e., for the search query being randomly selected), a piece of cached data (referred to as first piece of cached data) matching the search query is retrieved from the cache source 115 in operation 530. More specifically, the cache source 115 is provided with a search request including at least part of the search criteria or parameters included in the search query. The cache source 115 searches for cached data among all the cached data stored therein, which match with the search request, particularly the search criteria or parameters thereof. The cached data matching the search request is returned, as the first piece of cached data, from the cache source 115. This operation 530 is similar to operations 220, 225, and 230 shown in FIG. 2. If no cached data matching the search request is found, the method 500 may proceed further with cached data indicating no match.

Further, in operation 540, a piece of original data (referred to as first piece of original data) matching the search query is retrieved from the original data source 120. More specifically, the original data source 120 is provided with a search request including at least part of the search criteria or parameters included in the search query. The search request sent to the original data source 120 corresponds in view of the search criteria or parameters included to the search request sent to the cache source 115. The cache source 115 searches for original data matching the search request, particularly the search criteria or parameters thereof. The original data matching the search request is returned, as the first piece of original data, from the original data source 120. This operation 540 is similar to operations 250, 255, and 260 shown in FIG. 2. In some examples, the operations 530 and 540 are performed in parallel. If no original data matching the search query is found, the method 500 may proceed further with original data indicating no match.

In some examples, if no cached data in the cache source 115 matching the search query is found in operation 530, the search criteria or parameters of the search query may be made less restrictive, as described above in connection with FIG. 2 and then operation 530 is performed for the search query with the less restrictive search criteria or parameter. Also, if no original data in the original data source 120 matching the search query is found in operation 540, either a corresponding information indicating that no original data matching the search query is present in the original data source 120 or cached data found in operation 530 is returned to the client 130 in operation 570.

The method 500 may also include an operation 550 to update the first piece of cached data in the cache source 115 using the first piece of original data retrieved from the original data source 120. The operation 550 is similar to operation 270 shown in FIG. 2.

Then, in operation 560, the probabilistic model is adapted based on the first piece of cached data and the first piece of original data. The operation 560 may be performed for each search query randomly selected in operation 520. In general, the operation 560 is not individually performed for each selected search query, but in an asynchronous manner for a collected number of search queries randomly selected in operation 520. For example, asynchronously performing operation 520 means performing operation 520 when a given number of search queries have been selected and processed. Especially in case of performing operation 560 in the asynchronous manner, the first piece of cached data and the first piece of original data as retrieved by operations 530 and 540 are stored in the database system 600 for later processing in operation 560. The adapting the probabilistic model in operation 560 may use a machine learning algorithm, as will be described herein below. The operation 560 may be performed by the modeler 610, which is also configured to receive the first piece of cached data and the piece of original data for each search query being randomly selected.

Finally, or in parallel with either operation 550 or 560, the first piece of original data retrieved from the original data source 120 is returned to the client 130 as the search result in operation 570. Here, in case the search criteria or parameters of the search query have been made less restrictive as described above, returning the first piece of original data includes an indication that and how the search criteria or parameters of the search query have been changed so that they are less restrictive.

In an example, operation 560 includes comparing the first pieces of cached data and the first pieces of original data and determining a statistical value indicating a probability that the first piece of cached data coincides with the first piece of original data. In this case, i.e., if both first pieces coincide, retrieving the piece of original data from the original data source 120 would not have been necessary because the piece of cached data was still valid.

In response to the adaptation of the probabilistic model, the accuracy values of all or at least some pieces of cached data in the cache source 115 may be updated. For example, the accuracy values of the cached data may be updated by deriving them from the adapted probabilistic model.

In the subject disclosure, any machine learning algorithm which can be used in connection with probabilistic models may be established. For example, the machine learning algorithm, given a plurality of selected search queries converted into a set of structured features, builds a probabilistic model to predict a target (e.g., first indicator value stored with the search queries). The term "feature" here concerns any information that can be deduced from the search queries. The conversion of the plurality of selected search queries may comprise computing values of all features, using the search criteria and/or reference data (e.g., tables showing default output values for the given electronic circuit, etc.). For example, from all search criteria of the plurality of search queries and the reference data, the set of features to be used by the machine-learning algorithm may be selected. The set of features may therefore contain a mixture of search criteria and features requiring computations, but a feature may also correspond to one or more search criteria (e.g., all input parameter for a given electronic circuit to be simulated by the computer-based electronic circuit simulations, time-stamp of the search query, etc.). The set of features are structured as the machine-learning algorithm requires input of e.g. a structured data file (e.g., comma separated data file), with one row by search query and one column by feature.

The order of the columns follows a given pattern in order for the probabilistic model to be used correctly once deployed. The machine learning algorithm may also iteratively build a decision tree. Starting from the plurality of the selected search queries, the machine learning algorithm tests features and conditions on these features to split the plurality in two child sets. One of these tests may be "is the input parameter for the given electronic circuit equal to a voltage having a value of 10" (i.e., in general, check whether the feature equals a given value), or "is the input parameter for the given electronic circuit equal to a voltage having a value greater than 20 (i.e., in general, check whether the feature is greater/smaller than the given value). From all the features and conditions tested, the machine learning algorithm keeps only the feature and condition which separates the most the plurality into a first child set containing search queries with their target equal to one value, and a second child set containing the search queries with their target not equal to the one value. In other words, the decision tree is built by the machine learning algorithm such that a feature is taken as a node with two outgoing paths, one for search queries having the feature which equals the given value (the first child set) and another path for search queries having the feature which does not equal the given value (the second child set). That is, the search queries are divided into two child sets based on the feature. The machine learning algorithm progressively builds the decision tree, by then also splitting the child sets in smaller sets with the same feature and condition selection logic. The machine learning algorithm stops once the decision tree reaches a given size or complexity provided in parameter thereof.

As described above, FIG. 5 shows operations which are performed for each search query selected in operation 520 from among the plurality of search queries handled by the database system 600. Herein below, the operations to be performed for each search query not being selected in operation 520 of FIG. 5 will be described with reference to method 700 shown in FIG. 7.

In response to the search query not having been selected in operation 520 (i.e., for the search query not being randomly selected), a piece of cached data (referred to as second piece of cached data) matching the search query is retrieved from the cache source 115 in operation 710, similar to operations 220, 225, and 230 in FIG. 2. Specifically, the cache source 115 is provided with the search request as in operation 220 of FIG. 2 and is searched for cached data matching the search query, particularly the search criteria or parameters thereof, as in operation 225 of FIG. 2. The cached data matching the search query is returned, as the second piece of cached data, from the cache source 115 as in operation 230 of FIG. 2.

Figure 6:
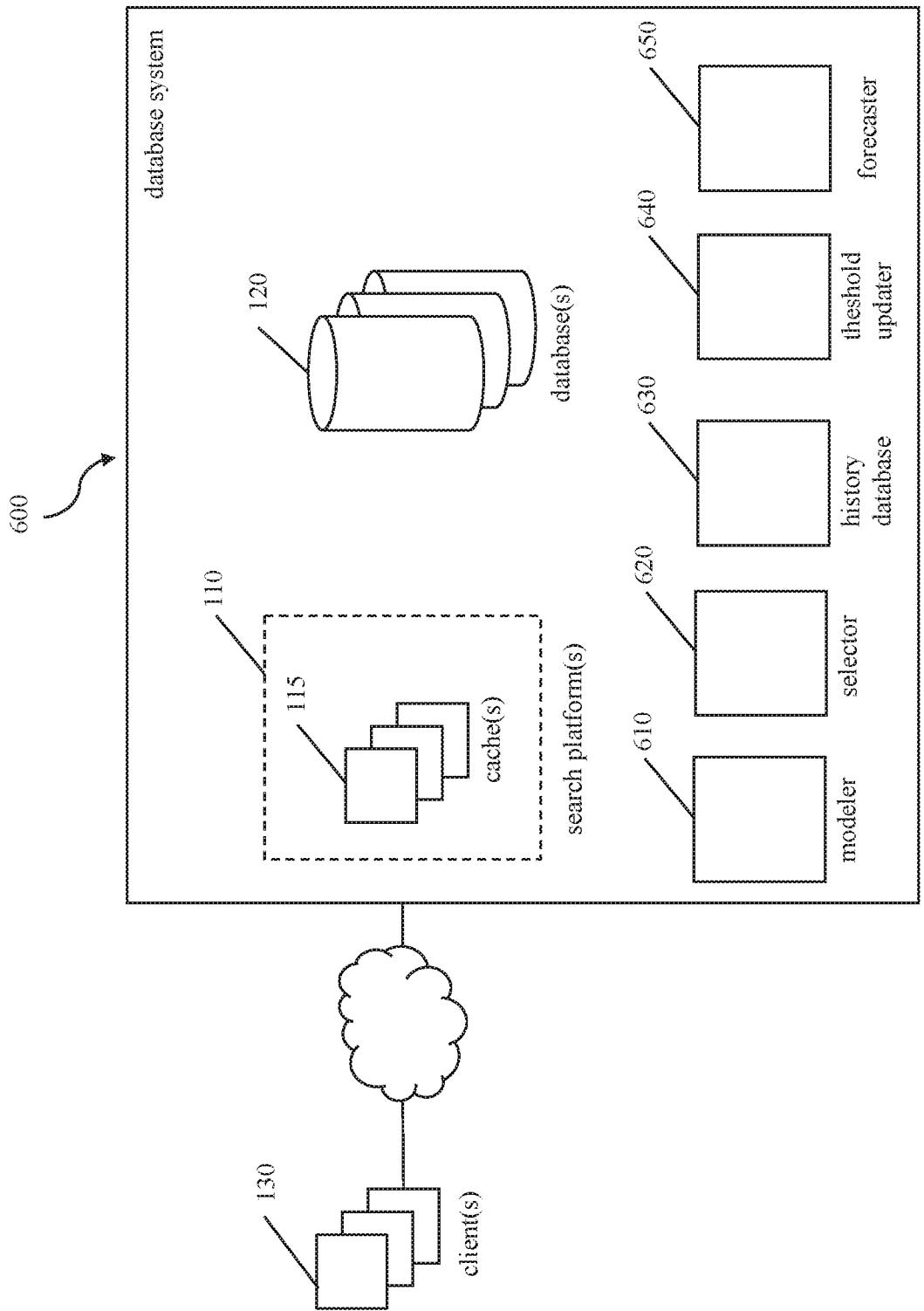
FIG. 6 shows an exemplary database system, in which the method shown in FIG. 5 may be performed.
Figure 7:
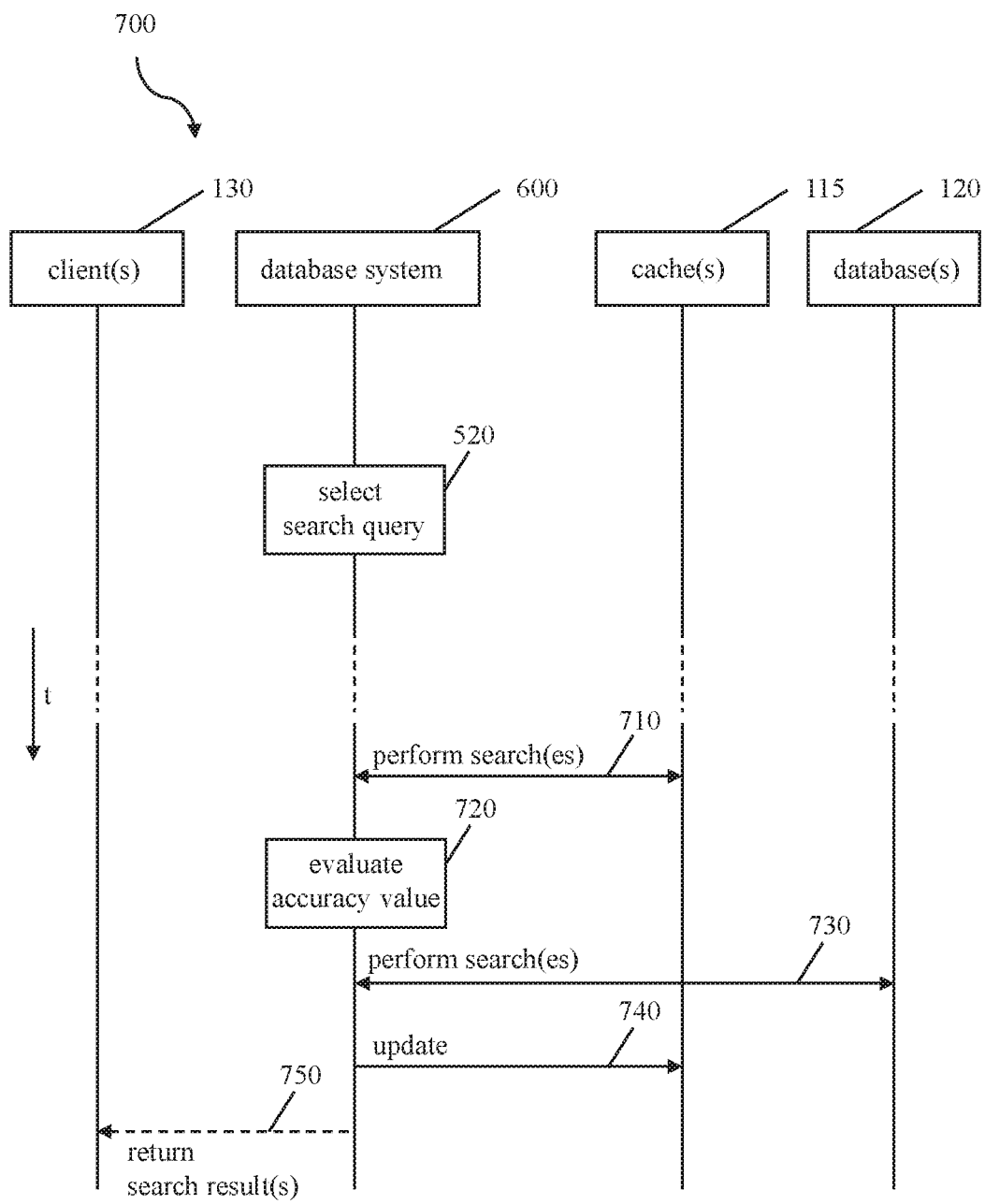
FIG. 7 shows an exemplary method for handling non-selected search queries within the method of FIG. 5.

The second piece of cached data retrieved from the cache source 115 is associated with the accuracy value, as described above. In response to retrieving the second piece of cached data in operation 710, the accuracy value of the second piece of cached data is evaluated in operation 720 by the forecaster 650 as shown in FIG. 6. For example, the accuracy value is compared with a given threshold. This operation is similar to operation 240 shown in FIG. 2.

In some examples, the threshold is prescribed by the client 130. For example, the client 130 includes the threshold (such as "at least 85%" or "at least 0.9" or "high" being likewise defined as "at least 0.9") in the search query when requesting search results from the database system 600. The client 130 may also send dedicated asynchronous messages indicating a desired threshold to the database system 600. The database system 600 stores these client-specific threshold prescriptions and employs them each time a search query is received from the respective client 130. Alternatively, in other examples, the threshold is set by a third party such as the operator of the database system 600. In this case, a single threshold may be applicable for all search queries received from all clients 130. The clients 130 may not have an influence on the threshold employed by the database system 600. Alternatively, the threshold pre-set by the third party may act as a default value and clients 130 may be able to override this default value by an own client-specific prescription.

If evaluating in operation 720 turns out that the accuracy value is below the given threshold, a piece of original data (referred to as second piece of original data) matching the search query is retrieved from the original data source 120 in operation 730. This operation 730 is similar to operations 250, 255, and 260 shown in FIG. 2. More specifically, the original data source 120 is provided with the search request, similar to operation 250 in FIG. 2, and is searched for original data matching the search query, particularly the search criteria or parameters thereof, similar to operation 255 in FIG. 2. The original data matching the search query is returned, as the second piece of original data, from the original data source 120, similar to operation 260 in FIG. 2.

In response to retrieving the second piece of original data, the second piece of cached data in the cache source 115 is updated by the second piece of original data in operation 740. This operation 740 is similar to operation 270 shown in FIG. 2. For example, the second piece of original data is stored in the cache source 115 such that the second piece of cached data is replaced, thereby forming a new piece of cached data in the cache source 115. Also, the second piece of original data may be stored in the cache source 115 as updated piece of cached data, which invalidated the previous second piece of cached data. Control data related with the accuracy value of the updated second piece of cached data such as an update timestamp may be updated as well. In an example, a garbage collector may be performed on the cache source 115, deleting any invalidated cached data and freeing the corresponding space in the cache source 115.

Depending on whether evaluating in operation 720 turned out that its accuracy value is above the given threshold or not, either the second piece of cached data or the second piece of original data is returned as search result to the client 130 in operation 750. This operation 750 may also be performed in parallel with operation 740. Here, in case the search criteria or parameters of the search query have been made less restrictive as described above, returning the second piece of original data or the second piece of cached data includes an indication that and how the search criteria or parameters of the search query have been changed so that they are less restrictive.

Figure 8:
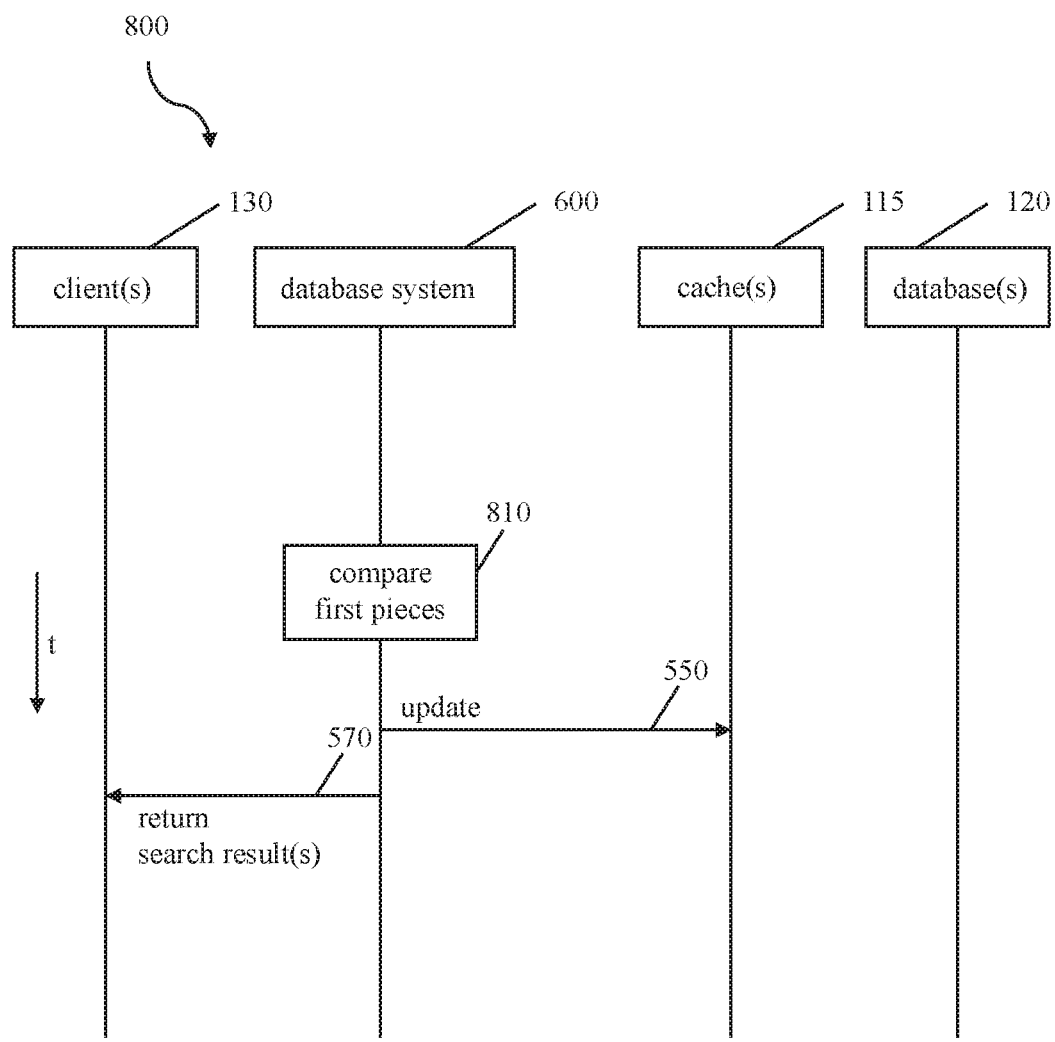
FIG. 8 shows an exemplary method of updating cached data within the method of FIG. 5

In an example, operation 550 of the method 500 shown in FIG. 5 may performed in accordance with method 800 shown in FIG. 8.

In response to retrieving the first piece of cached data from the cache source 115 and retrieving the first piece of original data from the original data source 120, it may be determined whether updating the first piece of cached data is appropriate or not.

The method 800 includes, in operation 810, comparing the first piece of cached data and the first piece of original data. The operation 810 of comparing is performed in order to check whether the first piece of cached data retrieved from the cache source 115 coincides with the first piece of original data retrieved from the original data source 120. If it is determined that the first pieces of cached/original data do not coincide, meaning that the first piece of cached data has already become outdated, the first piece of cached data is updated by the first piece of original data, in operation 550. This operation 550 is similar to operation 270 shown in FIG. 2. Independent from the result of operation 810, the first piece of original data is returned to the client 130, from which the search query has been received, as the search result.

In an example, in the selector 620 or in the database system 600, a number of search queries to be selected from among all the search queries handled by the database system 600 may be established. This increase the probabilistic significance as the number of selected search queries is considered in adapting the probability model. This number of selected search queries may be system-specific, pre-defined, or determined based on a factor derived from the probabilistic model. The number of selected search queries may apply for a given period of time such as, for example, one hour or one day. Accordingly, the operation 520 shown in FIG. 5 may be adapted so as to enable selection of search queries from among the search queries handled by the database system 600 in a number which corresponds to the number of selected search queries established. The selector 620 performs operation 520 only in case a number of search queries selected previously does not equal the number of selected search queries established; otherwise the search queries are handled in accordance with the method 700 shown in FIG. 7. In case of selecting a search query, the selector 420 increments the number of search queries selected previously. The selector 420 may reset the number of search queries selected previously after a given period of time for which the number of selected search queries applies.

In another example, the database system 600 includes a history or logging database 630. The history or logging database 630 may be embodied by any kind of databases, preferably by a distributed database, and may be separated from the original data source 120 or combined therewith. In the history or logging database 630, information about search queries, cached and original data retrieved in response to search queries are stored and maintained for further processing. In the method 500 shown in FIG. 5, e.g., following operation 540 for retrieving the first piece of original data from the original data source 120, information about the search query received from the client 130, the first piece of cached data retrieved from the cache source 115 in operation 530, and the first piece of original data retrieved from the original data source 120 in operation 540 are sent to the history or logging database 630. For example, the information about the search query may include one or more of the following: the search criteria or parameters of the search query, the time of receipt of the search query at the database system 600, information about the client 130 from which the search query has been received, and information about the response times to retrieve the first pieces of cached/original data. Also, the first piece of cached data may be sent to the history or logging database 630 together with the accuracy value it is associated with. The history or logging database 630 receives the information and stores the same in a structured manner, for example, as a n-tuple (e.g., 3-tuple or triple). The history or logging database 630 maintains and provides the information to the modeler 610, which uses the same in adapting the probabilistic model in operation 560. The information may be maintained in the history or logging database 630 for a given period of time, or discarded once used in adapting the probabilistic model in operation 560.

In yet another example, the database system 600 includes a threshold updater 640. The threshold updater 640 is responsible for updating the given threshold, if it is employed by the database system 600. The adaptation or variation of the given threshold enables the database system 600 to control the load such that only a number, or part, of the search queries handled by the database system 600 are processed using the original data source 120, thereby avoiding overload at the original data source 120. Also, the threshold updater 640 may provide and update a rule for adapting the threshold prescribed by the clients 130. The threshold updater 640 performs operations preferably in an asynchronous manner with the operations shown in FIG. 5, as well as the operations of the modeler 610 and the history database 630. The threshold updater 640 updates the given threshold on a regular basis, if it is triggered by a third-party, or if the number of search queries handled as selected search queries exceeds a given value.

Figure 9:
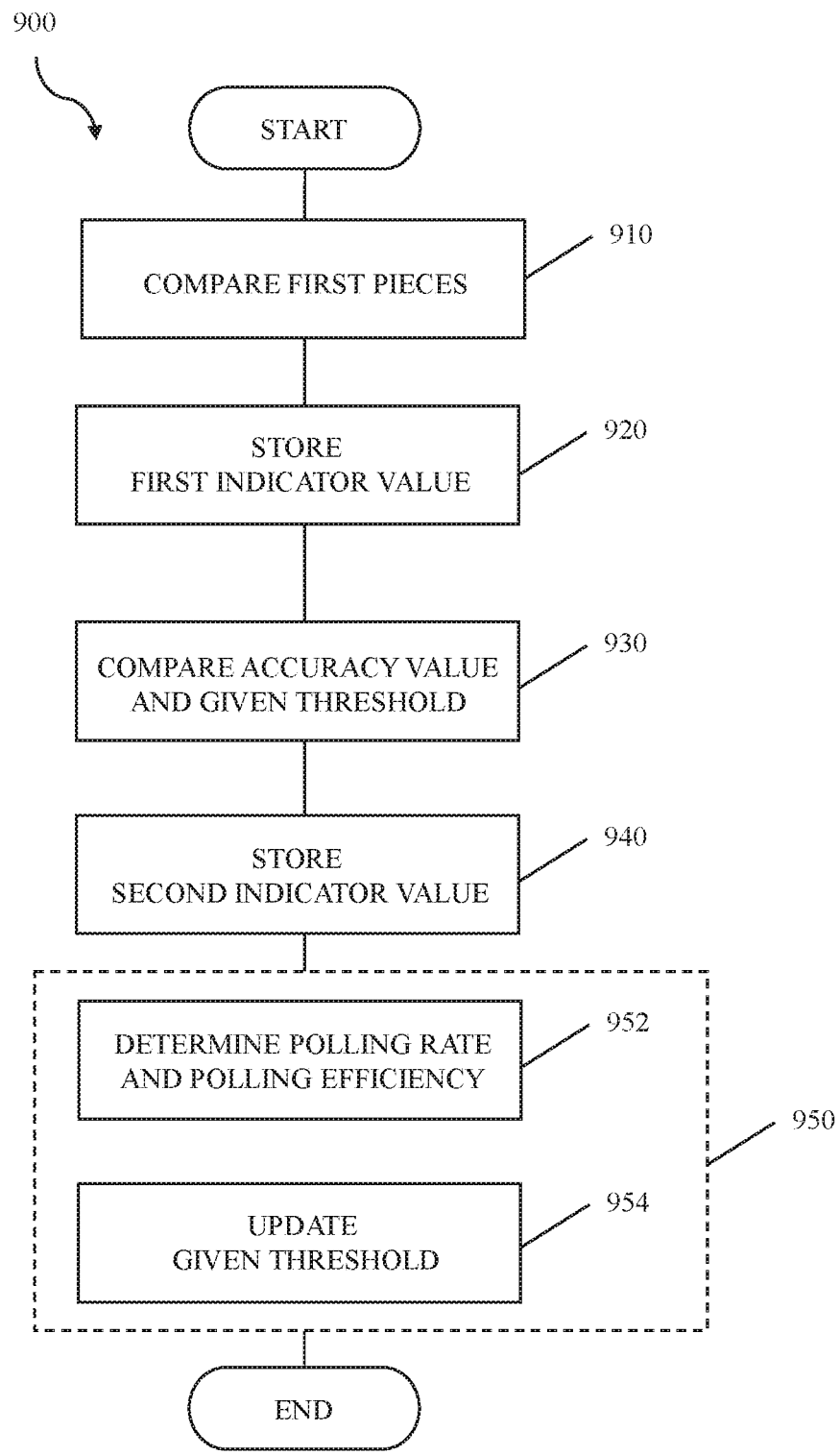
FIG. 9 shows an exemplary method of updating a threshold in the database system of FIG. 6.

The operation of the threshold updater 640 will now be described with reference to FIG. 9 showing a method 900 of updating the given threshold. Preferably, the method 900 of updating the given threshold is part of the method 500 of adapting the probabilistic model as shown in FIG. 5.

The method 900 of FIG. 9 starts with comparing the first piece of original data with the first piece of cached data in operation 910. The first piece of original data with the first piece of cached data to be compared may be retrieved by the threshold updater 640 from the history or logging database 630. Also, the first pieces of cached/original data to be compared may be sent to the threshold updater 640 in response to retrieving the same from the cache source 115 and the original data source 120.

In operation 920, a first indicator value is stored by the threshold updater 640. The first indicator value is provided by the threshold updater 640 for the first pieces of cached/original data compared, and indicates the result of the comparison. That is, the first indicator value is an indicator of whether the first pieces of cached/original data coincide with each other or not. For example, the first indicator value is represented by a value of one bit, where the value "1" represents that the first pieces coincide with each other, while the value "0" represents that the first pieces do not coincide. The first indicator value may be held in the threshold updater 640 in association with the first pieces of cached/original data or may be sent to the history or logging database 630 for storage as value in the n-tuple of the corresponding first pieces of cached/original data.

Then, in operation 930, the accuracy value associated with the first piece of cached data retrieved from the history or logging database 630 is compared with the given threshold, i.e., with the given threshold currently established in the database system 600 or in view of the corresponding search query.

In operation 940, a second indicator value is stored by the threshold updater 640. The second indicator value is provided by the threshold updater 640 for the first piece of cached data, the accuracy value of which has been used in the comparison of operation 930, and indicates the result of the comparison. That is, the second indicator value is an indicator value of whether the accuracy value is below the given threshold or not. For example, the second indicator value is represented by a value of one bit, where the value "1" represents that the accuracy value is below the given threshold, while the value "0" represents that the accuracy value is not below the given threshold. The second indicator value may be held in the threshold updater 640 in association with the first piece of cached data or may be sent to the history or logging database 630 for storage as value in the n-tuple of the corresponding first piece of cached data.

Based on the first and second indicator values, either held in the threshold updater 640 or retrieved from the history or logging database 630, the given threshold is updated in operation 940.

The given threshold as updated by the method 900 is established in the database system 600 and used for subsequent search queries.

In a preferred example, the method 900 of FIG. 9 is performed by the threshold updater 640 for each of a plurality of first pieces of cached/original data stored in the history or logging database 630 in the form of batch processing.

In an example, the operation 940 of method 900 includes the operation 942 of determining a polling rate and a polling efficiency based on pairs of the first and second indicator values, and the operation 944 of updating the given threshold based on the polling rate and the polling efficiency. Here, a plurality of the first and second indicator values are taken into account, and possibly retrieved from the history or logging database 630 prior to operation 942. The polling rate indicates the rate at which the polling operation is performed. That is, the polling rate is the rate between the total number of polling operations actually performed and the total number of possible polling operations (i.e., if the polling operation is performed for each search query). For example, the polling rate is a ratio between a number of the second indicator values indicating that the accuracy value is below the given threshold, i.e., indicating that the first piece of cached data has become outdated and is assumed to not coincide with the corresponding first piece of original data, and a total number of the second indicator values. The polling efficiency indicates how efficient the polling operations have been. That is, the polling efficiency is a ratio between the number of polling operations performed while the accuracy value was below the given threshold and the cached data have already been outdated, and the total number of polling operations actually performed. For example, the polling efficiency is a ratio between a number of the second indicator values indicating that the accuracy value is below the given threshold, wherein the first piece of cached data has already become outdated, and a total number of the second indicator values indicating that the accuracy value is below the given threshold.

In the above example, the polling rate may be determined based on the following equation (1):

$$\text{Polling rate} = \frac{(TP + FP)}{(TP + FP + TN + FN)} \quad (1)$$

The polling efficiency may be determined in the above example based on the following equation (2):

$$\text{Polling efficiency} = \frac{TP}{(TP + FP)} \quad (2)$$

In the equations (1) and (2):

TP is a number of said pairs wherein the first indicator value indicates that the piece of original data does not coincide with the piece of cached data, and the second indicator value indicates that the accuracy value is below the given threshold;

TN is a number of said pairs wherein the first indicator value indicates that the piece of original data coincides with the piece of cached data, and the second indicator value indicates that the accuracy value is not below the given threshold;

FP is a number of said pairs wherein the first indicator value indicates that the piece of original data coincides with the piece of cached data, and the second indicator value indicates that the accuracy value is below the given threshold, and FN is a number of said pairs wherein the first indicator value indicates that the piece of original data does not coincide with the piece of cached data, and the second indicator value indicates that the accuracy value is not below the given threshold.

Also, in the above example, if the polling rate computed on the plurality of pairs is above a desired value (e.g., hardware limit of the original data source 120), the given threshold may be increased. Otherwise, if the polling rate is lower than the desired value, the given threshold may be decreased. Iteratively on one batch or several batches of the plurality of pairs, the given threshold converges toward a value enabling to reach the desired value of the polling rate.

Figure 10:
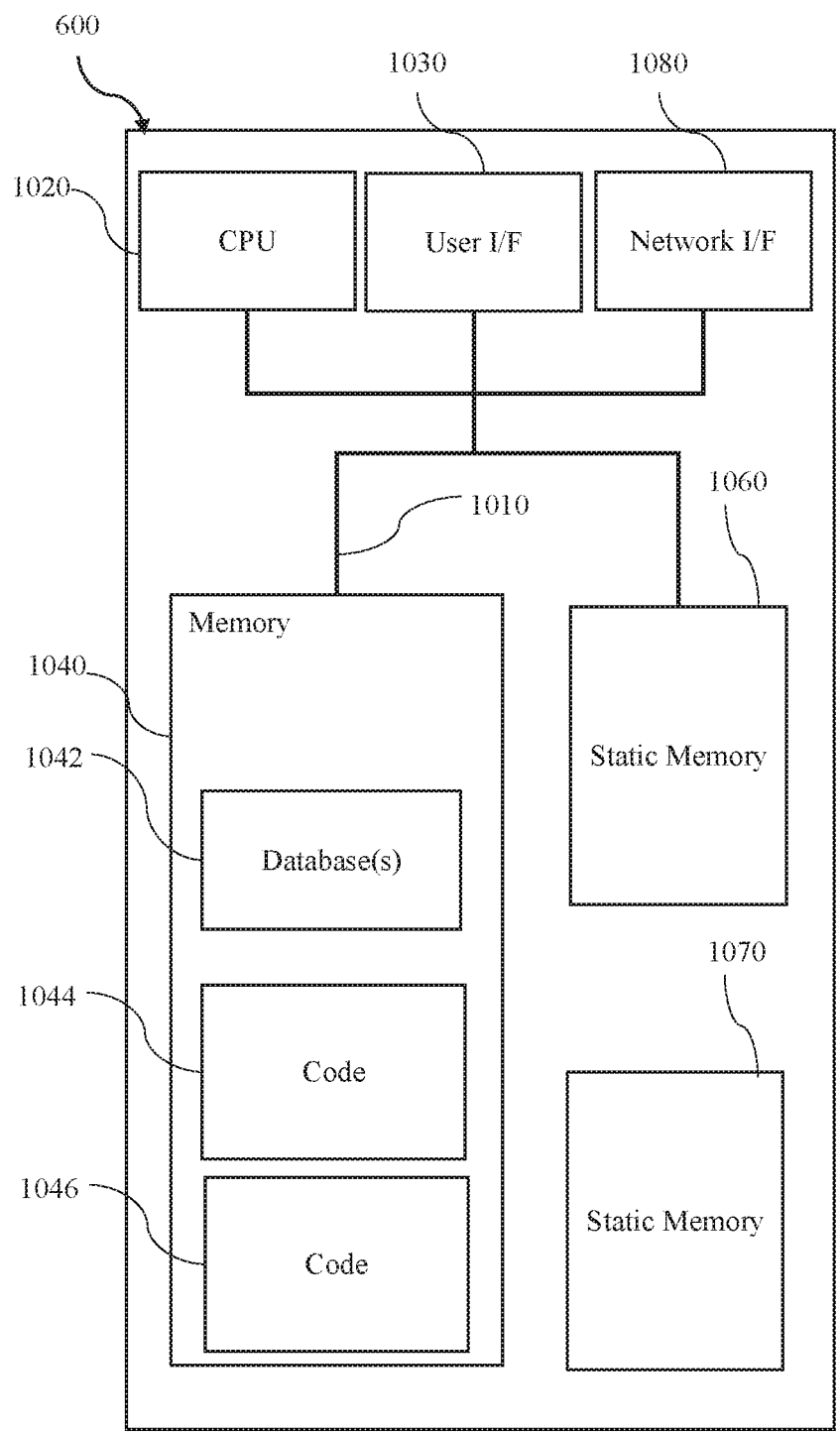
FIG. 10 shows a schematic representation of a computer system in accordance with an embodiment.

Finally, FIG. 10 is a diagrammatic representation of a computer system which provides the functionality of the database system 600 of FIG. 6. Within the database system 600a set of instructions, to cause the computer system to perform any of the methodologies discussed herein, may be executed. The database system 600 includes at least one processor 1020, a main memory 1040 and a network interface device 1080, which communicate with each other via a bus 1010. Optionally, it may further include a static memory 1060 and a disk-drive unit 1070. A video display, an alpha-numeric input device and a cursor control device may be provided as examples of user interface 1030. The network interface device 1080 connects the computer system 600 at least to the clients 130, one or more databases acting as the original data source 120 and the history or logging database 630, if provided external to the database system 600, other computing devices, if provided external to the database system 600, acting as the modeler 610, the selector 620 and the threshold updater 640, the Internet and/or any other network. Also, the one or more databases acting as the original data source 120 and the history or logging database 630 may be provided as databases 1042 within the main memory 1040. A set of computer-executable instructions (i.e., computer program code) 1044 embodying any one, or all, of the methodologies described above, resides completely, or at least partially, in or on a machine-readable medium, e.g., the main memory 1040 and/or the at least one processor 1020. A machine-readable medium on which the code 1044 resides may also be a non-volatile data carrier (e.g., a non-removable magnetic hard disk or an optical or magnetic removable disk) which is part of disk drive unit 1070. The code 1044 may further be transmitted or received as a propagated signal via the Internet through the network interface device 1080. Basic operation of the database system 600 including user interface and network communication is controlled by operating system 1046.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow charts, sequence diagrams, and/or block diagrams.

The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow charts, sequence diagrams, and/or block diagrams.

In certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

The invention claimed is:

1. A method of processing queries in a database system, the database system comprising an original data source storing a plurality of pieces of original data and a cache source storing a plurality of pieces of cached data, each piece of cached data being associated with an accuracy value, the method comprising:
   randomly selecting queries from among a plurality of queries handled by the database system, at the time the respective query is received from a client;
   for each of the queries randomly selected,
      retrieving a first piece of the cached data matching the randomly selected query from the cache source, and
      retrieving a first piece of the original data matching the randomly selected query from the original data source;
   for queries not being randomly selected,
      retrieving a second piece of the cached data matching the query from the cache source;
      evaluating the accuracy value of the second piece of the cached data;
      if the accuracy value is below a given threshold,
         retrieving a second piece of the original data matching the query from the original data source, and updating the second piece of the cached data by the second piece of the original data; and adapting a probabilistic model based on the first piece of the cached data and the first piece of the original data using a machine learning algorithm, wherein the accuracy value is derived from the probabilistic model and indicates a probability that a piece of the cached data coincides with a corresponding piece of the original data.

2. The method of claim 1, further comprising:
for the queries randomly selected,
  comparing the first piece of the cached data and the first piece of the original data;
  updating the first piece of the cached data by the first piece of the original data, and returning the first piece of the original data to the client.

3. The method of claim 1, further comprising:
for queries not being randomly selected,
  if the accuracy value is below the given threshold, returning the second piece of the original data as a result to the client; and
  otherwise, returning the second piece of the cached data as the result to the client.

4. The method of claim 1, further comprising:
for each of the queries randomly selected,
  sending information about the query, the first piece of the cached data and the first piece of the original data to a history database of the database system.

5. The method of claim 1, further comprising:
comparing the first piece of the original data with the first piece of the cached data;
storing a first indicator value indicating whether the first piece of the original data coincides with the first piece of the cached data;
comparing the accuracy value of the first piece of the cached data and the given threshold;
storing a second indicator value indicating whether the accuracy value is below the given threshold; and
updating the given threshold based on pairs of the first and the second indicator values.

6. The method of claim 5, wherein updating the given threshold comprises:
determining a polling rate and a polling efficiency based on the pairs of the first and second indicator values; and
updating the given threshold based on the polling rate and the polling efficiency.

7. The method of claim 6, wherein
the polling rate is determined based on equation: $(TP+FP)/(TP+FP+TN+FN)$, and
the polling efficiency is determined based on equation: $TP/(TP+FP)$,
where:
  TP is a number of said pairs wherein the first indicator value indicates that the piece of the original data does not coincide with the piece of the cached data, and the second indicator value indicates that the accuracy value is below the given threshold,
  TN is a number of said pairs wherein the first indicator value indicates that the piece of the original data coincides with the piece of the cached data, and the second indicator value indicates that the accuracy value is not below the given threshold,
  FP is a number of said pairs wherein the first indicator value indicates that the piece of the original data coincides with the piece of the cached data, and the second indicator value indicates that the accuracy value is below the given threshold, and
  FN is a number of said pairs wherein the first indicator value indicates that the piece of the original data does not coincide with the piece of the cached data, and the second indicator value indicates that the accuracy value is not below the given threshold.

8. A database system for processing queries, comprising:
a memory containing an original data source storing a plurality of pieces of original data and a cache source storing a plurality of pieces of cached data, each piece of cached data being associated with an accuracy value
a processor coupled to the memory, the processor configured to:
  randomly select queries from among a plurality of queries handled by the database system, at the time the respective query is received from a client;
  for each of the queries randomly selected,
    retrieve a first piece of the cached data matching the randomly selected query from the cache source, and
    retrieve a first piece of the original data matching the randomly selected query from the original data source;
  for queries not being randomly selected,
    retrieve a second piece of the cached data matching the query from the cache source;
    evaluate the accuracy value of the second piece of the cached data;
    if the accuracy value is below a given threshold,
      retrieve a second piece of the original data matching the query from the original data source, and
      update the second piece of the cached data by the second piece of the original data; and
  adapt a probabilistic model based on the first piece of the cached data and the first piece of the original data using a machine learning algorithm,
  wherein the accuracy value is derived from the probabilistic model and indicates a probability that a piece of the cached data coincides with a corresponding piece of the original data.

9. The database system of claim 8, wherein the processor is further configured to:
for the queries randomly selected,
  compare the first piece of the cached data and the first piece of the original data;
  update the first piece of the cached data by the first piece of the original data, and return the first piece of the original data to the client.

10. The database system of claim 8, wherein the processor is further configured to:
for queries not being randomly selected,
  if the accuracy value is below the given threshold, return the second piece of the original data as a result to the client; and
  otherwise, return the second piece of the cached data as the result to the client.

11. The database system of claim 8, wherein the processor is further configured to:
for each of the queries randomly selected,
  send information about the query, the first piece of the cached data and the first piece of the original data to a history database of the database system.

12. The database system of claim 8, wherein the processor is further configured to:
compare the first piece of the original data with the first piece of the cached data;

store a first indicator value indicating whether the first piece of the original data coincides with the first piece of the cached data;

compare the accuracy value of the first piece of the cached data and the given threshold;

store a second indicator value indicating whether the accuracy value is below the given threshold; and update the given threshold based on pairs of the first and the second indicator values.

13. The database system of claim 12, wherein the processor is configured to update the given threshold by:

determining a polling rate and a polling efficiency based on the pairs of the first and second indicator values; and updating the given threshold based on the polling rate and the polling efficiency.

14. The database system of claim 13, wherein the polling rate is determined based on equation: (TP+FP)/(TP+FP+TN+FN), and wherein the polling efficiency is determined based on equation: TP/(TP+FP), where:

TP is a number of said pairs wherein the first indicator value indicates that the piece of the original data does not coincide with the piece of the cached data, and the second indicator value indicates that the accuracy value is below the given threshold, TN is a number of said pairs wherein the first indicator value indicates that the piece of the original data coincides with the piece of the cached data, and the second indicator value indicates that the accuracy value is not below the given threshold, FP is a number of said pairs wherein the first indicator value indicates that the piece of the original data coincides with the piece of the cached data, and the second indicator value indicates that the accuracy value is below the given threshold, and FN is a number of said pairs wherein the first indicator value indicates that the piece of the original data does not coincide with the piece of the cached data, and the second indicator value indicates that the accuracy value is not below the given threshold.

15. A computer program product comprising instructions which, when executed by a computer, cause the computer to perform the method according to claim 1.

\* \* \* \* \*